(12) United States Patent
Hosking

(10) Patent No.: US 9,914,204 B2
(45) Date of Patent: Mar. 13, 2018

(54) POWER TOOLS AND HAND OPERATED ELECTRICAL DEVICES

(71) Applicant: Peter John Hosking, Mooroolbark (AU)

(72) Inventor: Peter John Hosking, Mooroolbark (AU)

(*) Notice: Subject to any disclaimer, the term of this patent is extended or adjusted under 35 U.S.C. 154(b) by 478 days.

(21) Appl. No.: 14/415,627

(22) PCT Filed: Jul. 19, 2013

(86) PCT No.: PCT/IB2013/055944
§ 371 (c)(1),
(2) Date: Jan. 19, 2015

(87) PCT Pub. No.: WO2014/013474
PCT Pub. Date: Jan. 23, 2014

(65) Prior Publication Data
US 2015/0174750 A1  Jun. 25, 2015

(30) Foreign Application Priority Data
Jul. 20, 2012 (GB) .................................. 1212958.1

(51) Int. Cl.
*B25F 5/02* (2006.01)
*B25F 5/00* (2006.01)
(Continued)

(52) U.S. Cl.
CPC ............... *B25F 5/00* (2013.01); *B25B 21/00* (2013.01); *B25F 5/001* (2013.01); *B25F 5/02* (2013.01); *B23B 45/02* (2013.01)

(58) Field of Classification Search
CPC .... B25F 5/00; B25F 5/02; B25F 5/001; B25B 21/00; B25B 21/008; B25B 23/00; B25B 23/14; B23B 45/02
USPC ............ 173/1, 2, 176, 213, 217, 162.2, 170; 200/179, 334, 302.1, 302.2, 332.2, 522; 340/67, 680, 686.5, 689; 388/838, 937; (Continued)

(56) References Cited

U.S. PATENT DOCUMENTS 3,386,067 A   5/1968   Costanzo
4,821,013 A * 4/1989   Iida ...................... H01C 10/106
                                                          338/114
(Continued)

FOREIGN PATENT DOCUMENTS

DE    10334884       3/2005
EP    1 081 725 A2   3/2001
(Continued)

OTHER PUBLICATIONS

Extended European Search Report for European Application No. 13819719.9, "Power Tools and Hand Operated Electrical Devices," dated Apr. 21, 2016.
(Continued)

*Primary Examiner* — Scott A. Smith
(74) *Attorney, Agent, or Firm* — Hamilton, Brook, Smith & Reynolds, P.C.

(57) ABSTRACT

A power tool (10) comprises a motor for driving a driven element of the power tool (10) and a handle section (12), wherein the power tool (10) incorporates first and second pressure sensitive switches (18,20) operable to control operation of the motor.

18 Claims, 8 Drawing Sheets

(51) Int. Cl.
*B25B 21/00* (2006.01)
*B23B 45/02* (2006.01)

(58) Field of Classification Search
USPC ........... 318/268, 256, 139; 73/86.21, 862.26, 73/862.35, 849, 760
See application file for complete search history.

(56) References Cited

U.S. PATENT DOCUMENTS

| | | | |
|---|---|---|---|
| 4,822,958 A | 4/1989 | Van Laere | |
| 4,844,177 A | 7/1989 | Robinson et al. | |
| 5,365,155 A | 11/1994 | Zimmermann | |
| 5,914,882 A * | 6/1999 | Yeghiazarians | F16P 3/00 408/1 R |
| 5,917,165 A * | 6/1999 | Platt | H03K 17/962 200/511 |
| 6,049,460 A * | 4/2000 | Lin | H01H 9/061 361/704 |
| 6,111,515 A * | 8/2000 | Schaer | B25F 5/00 340/679 |
| 6,923,268 B2 * | 8/2005 | Totsu | B25B 21/00 173/170 |
| 7,055,622 B2 * | 6/2006 | Bone | B25F 5/02 173/170 |
| 7,090,030 B2 * | 8/2006 | Miller | B25B 21/00 173/182 |
| 7,182,148 B1 * | 2/2007 | Szieff | B25B 21/00 173/171 |
| 7,197,961 B2 * | 4/2007 | Kageler | B25B 21/00 173/217 |
| 7,546,785 B2 * | 6/2009 | Roehm | B25B 21/00 320/114 |
| 7,638,958 B2 | 12/2009 | Philipp et al. | |
| 7,682,035 B2 * | 3/2010 | Wuensch | B25F 5/00 362/109 |
| 7,861,796 B2 * | 1/2011 | DeCicco | B25B 21/00 173/1 |
| 7,882,899 B2 * | 2/2011 | Borinato | B23B 45/008 173/176 |
| 8,047,083 B2 | 11/2011 | Puzio et al. | |
| 8,286,723 B2 * | 10/2012 | Puzio | B25B 23/0064 173/1 |
| 8,403,072 B2 * | 3/2013 | Eshleman | B25B 21/00 173/1 |
| 8,418,778 B2 * | 4/2013 | Eshleman | B25B 21/00 173/1 |
| 9,321,155 B2 * | 4/2016 | Eshleman | B25F 5/00 |
| 2003/0016533 A1 | 1/2003 | Forsythe | |
| 2005/0248320 A1 * | 11/2005 | Denning | B25F 5/00 320/141 |
| 2007/0085496 A1 * | 4/2007 | Philipp | A61B 17/151 318/139 |
| 2010/0061181 A1 | 3/2010 | Malackowski et al. | |
| 2010/0071920 A1 | 3/2010 | Lau et al. | |
| 2010/0206703 A1 | 8/2010 | Puzio et al. | |
| 2011/0203821 A1 * | 8/2011 | Puzio | B25B 23/0064 173/1 |
| 2012/0068633 A1 | 3/2012 | Watanabe et al. | |

FOREIGN PATENT DOCUMENTS

| | | |
|---|---|---|
| EP | 1 440 771 A1 | 7/2004 |
| EP | 2 431 987 A2 | 3/2012 |
| GB | 1124474 | 8/1968 |
| GB | 2106024 A | 9/1981 |
| JP | 51133889 A | 11/1976 |
| JP | 6262414 A | 9/1994 |
| JP | 2009244206 A | 10/2009 |
| WO | WO 01/71243 A1 | 9/2001 |
| WO | WO 2007/002180 A2 | 1/2007 |
| WO | WO 2012/076612 A1 | 6/2012 |
| WO | WO 2014/013474 A1 | 1/2014 |

OTHER PUBLICATIONS

International Search Report in re: International Application No. PCT/IB2013/055944; dated Nov. 20, 2013, by ISA/AU.

* cited by examiner

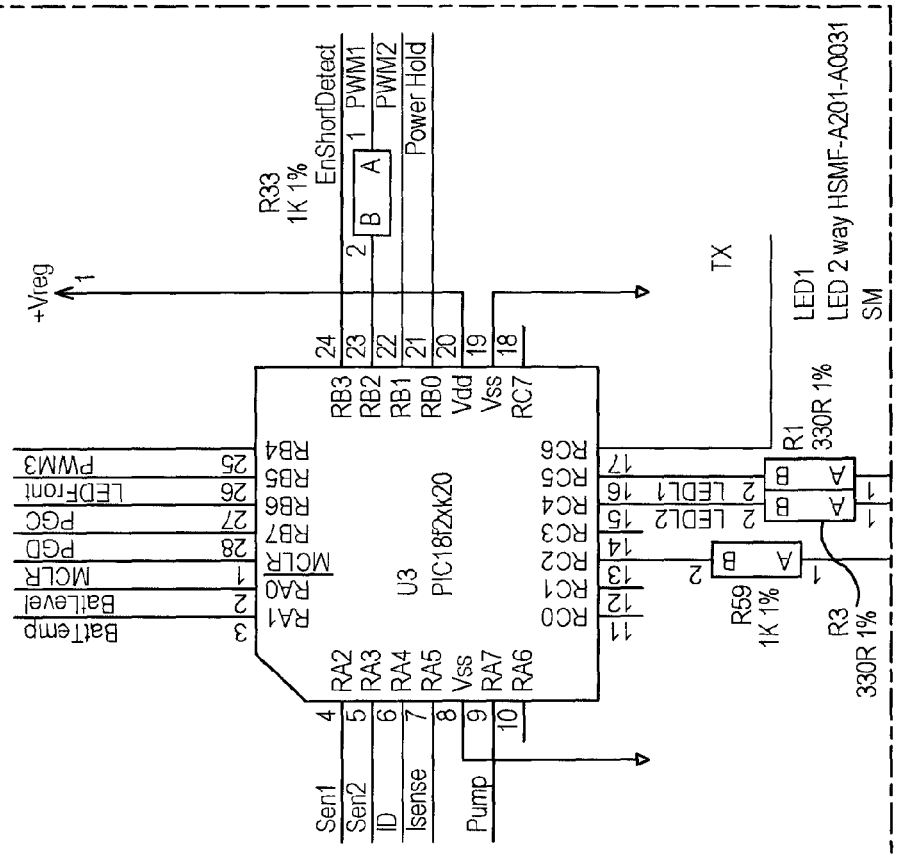
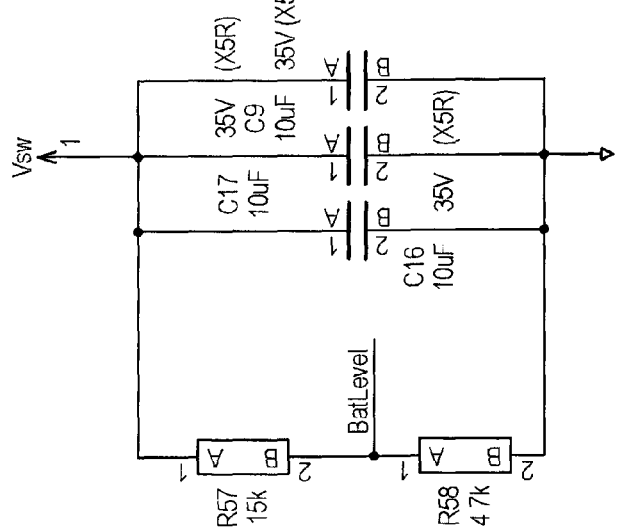
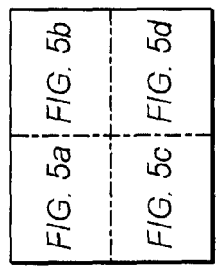
FIG. 5a
FIG. 5

POWER TOOLS AND HAND OPERATED ELECTRICAL DEVICES

This application is the U.S. National Stage of International Application No. PCT/IB2013/055944, filed Jul. 19, 2013, published in English, which claims priority under 35 U.S.C. § 119 or 365 to Great Britain, Application No. 1212958.1, filed Jul. 20, 2012. The entire teachings of the above applications are incorporated herein by reference.

This invention relates to power tools, particularly, but not exclusively, handheld power tools with pressure sensitive switches and to hand operated electrical device.

Existing portable power tools are often operated by means of a trigger switch located on a handle portion. Travel of the trigger switch engages a slide-type variable resistor which is used to vary the speed of rotation of a motor of the handheld power tool.

Disadvantages arise with this type of power tool in that the amount of travel required of the switch uses a separate trigger piece and a user's skin can become trapped between the moveable trigger piece and a body of the handheld power tool. A long travel switch can also be difficult to incorporate into an ergonomically well-designed device. Also, prolonged use of the prior art power tool can result in undesirable fatigue to a user, because of the amount of force required to obtain a required speed of rotation of the motor of the handheld power tool. Fluids can also very easily enter the handle part between the trigger and handle body.

It is an object of the present invention to address the above-mentioned disadvantages.

According to the present invention there is provided an apparatus and method as set forth in the appended claims. Other features of the invention will be apparent from the dependent claims, and the description which follows.

According to a first aspect of the present invention there is provided a power tool comprising a motor for driving a driven element of the power tool and a handle section, wherein the power tool incorporates first and second pressure sensitive switches operable to control operation of the motor.

The power tool may be a portable, and/or handheld, power tool.

The pressure sensitive switches preferably include at least one variable resistance switch.

The pressure sensitive switches preferably include at least one switch having a resistance that varies according to an amount of pressure applied to the switch.

The pressure sensitive switches preferably include at least one switch comprising a pressure sensitive composite material.

Preferably one of the switches is adapted to cause the motor to drive in a forward direction. Preferably one of the switches is adapted to cause the motor to drive a reverse direction.

The power tool is preferably adapted to enable power to be provided to the motor only after both of the first and second pressure sensitive switches have been activated, preferably simultaneously. Circuitry of the power tool is preferably powered up when at least one of the first and second pressure sensitive switches is activated.

One of the switches may be operable to power-up a control circuit of the power tool when depressed and the other switch may be operable to cause a variable power to be supplied to the motor, wherein the power is varied dependent on an amount of pressure applied to said other switch. Said other switch may be operable to cause braking of the motor when a pressure applied to said other switch is reduced.

At least one of the switches may comprise a sensor element, which may be a pressure sensing material. The at least one switch may include a, preferably resilient, contact element adapted to contact the sensor element in response to pressure exerted by a user. The contact element may be made of a resilient plastics material. The contact element may be biased to leave a space between it and the sensor element in the absence of pressure from a user exerted thereon. The at least one switch may incorporate a, preferably flexible, cover element. The cover element is preferably adapted to flex and transmit force exerted by a user to the contact element. The cover element may be waterproof.

The first and second pressure sensitive switches may be housed in a switch assembly, which may incorporate a sensor element and contact element for each of the first and second pressure sensitive switches. The switch assembly may include a, preferably unitary, cover element for both the first and second pressure sensitive switches. The switch assembly may include a guide element to guide movement of the contact elements. The switch assembly may include a sensor element mounting part adapted to receive and preferably protect the sensor elements.

The power tool may be any one of power drill, an impact driver, a rotary tool, an oscillating-head tool. Any of these may be battery powered or powered by a mains supply.

The invention extends to a switch assembly for a power tool as described above.

According to a further aspect of the present invention there is provided a hand operated electrical device comprising a head section and a handle section, wherein the electrical device incorporates first and second pressure sensitive switches operable to control operation of the head section.

The head section may incorporate a motor. The head section may incorporate illumination means, which may be a torch.

For a better understanding of the invention, and to show how embodiments of the same may be carried into effect, reference will now be made, by way of example, to the accompanying diagrammatic drawings in which.

Figure 1:
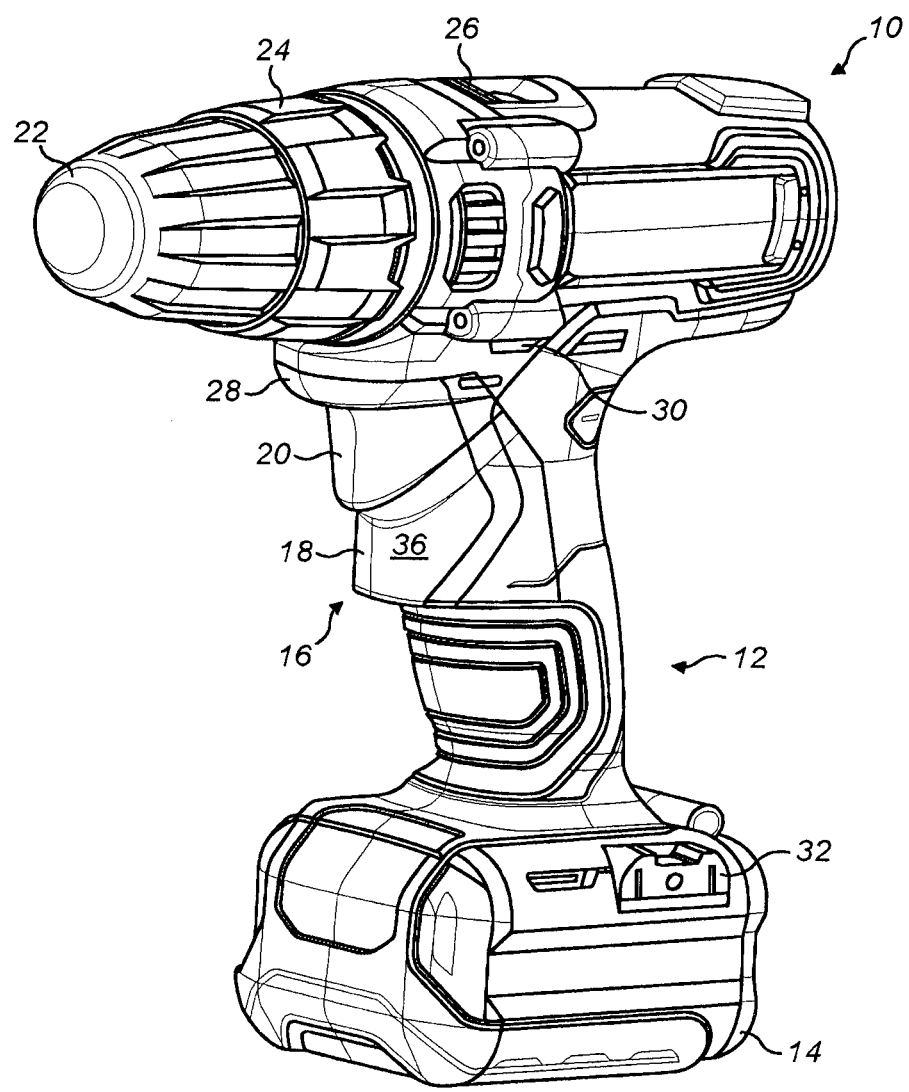
FIG. 1 is a schematic side perspective view of a handheld power tool.

A handheld power tool 10, which as shown in FIG. 1 is a handheld power drill, but could equally be an impact driver, a torch, a rotary tool or an oscillating tool. The power tool 10 comprises a motor (not shown, but located inside the body beneath 26 and omitted when the tool is a torch), a handle portion 12, a battery pack/power source portion 14. A switch assembly 16 comprises a reverse direction pad 18 and a forward direction pad 20. The power tool also incorporates a chuck 22, a torque setting collar 24 and a gear selector (high/low speed) switch 26.

The power tool 10 also incorporates a task light 28 for use in illuminating the work done by an operator and a charge status indicator 30 which will be discussed in more detail below.

The battery pack 14 comprises mount points 32 for an accessory, such as one to hold drill bits or the like.

Figure 2:
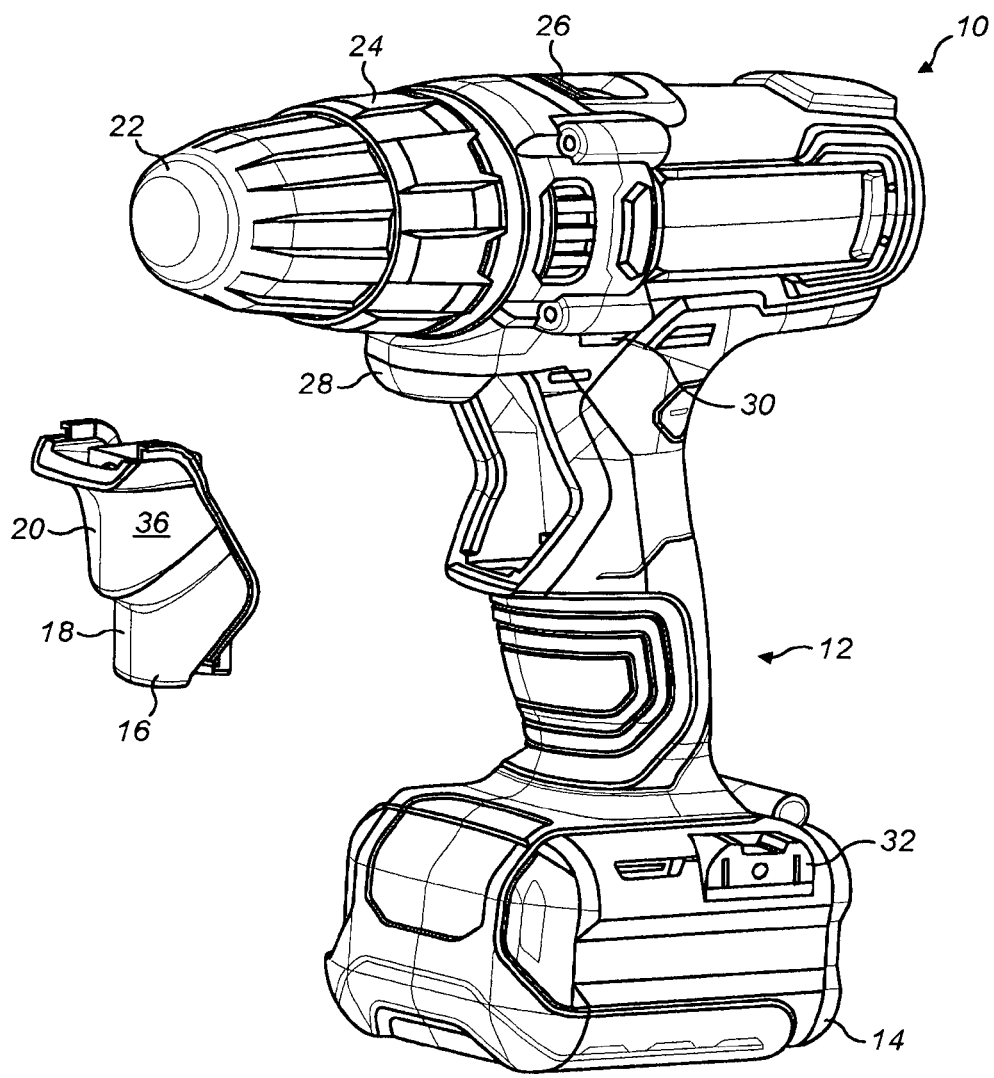
FIG. 2 is a schematic partially exploded perspective view of the handheld power tool shown in FIG. 1 with a trigger sub-assembly separated therefrom for illustrative purposes.

There are two types of battery pack 14. A standard slide-engaging pack which is removed for charging (not shown in FIGS. 1-4), and an integrated pack type as shown in FIGS. 1 & 2. This type of battery arrangement has a hinged door at the rear where cell packs are removed for charging. This method allows for lower cost battery pack manufacture.

The chuck 22, torque setting collar 24 and gear selector 26 work in the manner usual for handheld power tools.

Figure 3:
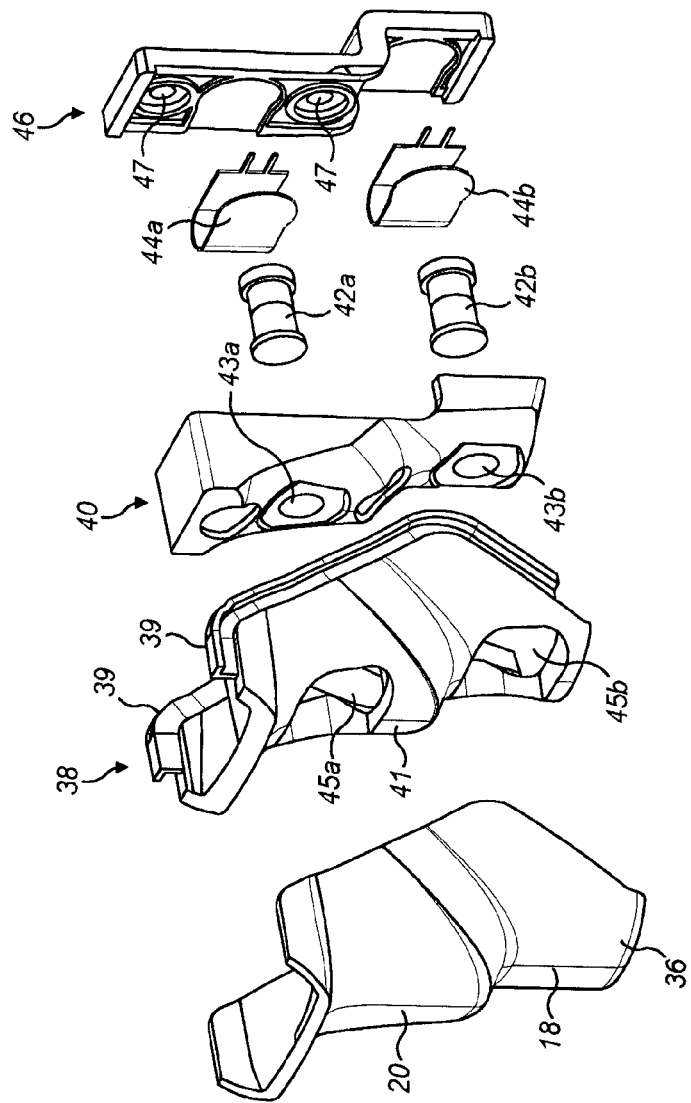
FIG. 3 is a schematic perspective exploded view of the trigger assembly.
Figure 3:
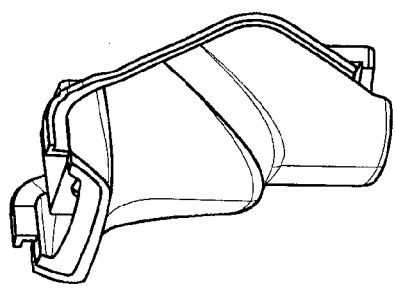

The trigger assembly 16 is shown in more detail in FIG. 3.

The switch assembly 16 comprises a rubber overmould section 36 having flexible characteristics that covers an outer surface of the switch assembly 16. As shown in FIG. 3 within the overmould section 36 there is carrier section 38 that is rigid and is used to mount the switch assembly 16 into the handle section 12 of the power tool 10.

Beneath the carrier section 38 there is a plunger housing 40 that is used to guide plungers 42a and 42b, which are used to actuate sensors 44a and 44b.

In addition there is a backing plate 46 that is used to encapsulate the switch assembly 16 with the carrier section 38. Openings 47 in the backing plate 46 receive fixings (not shown) to secure the backing plate 46 to the carrier section 38. The fixings are received in openings 47a in the carrier section. The backing plate 46 and carrier section 38 may be secured together by snap fixings.

Figure 4:
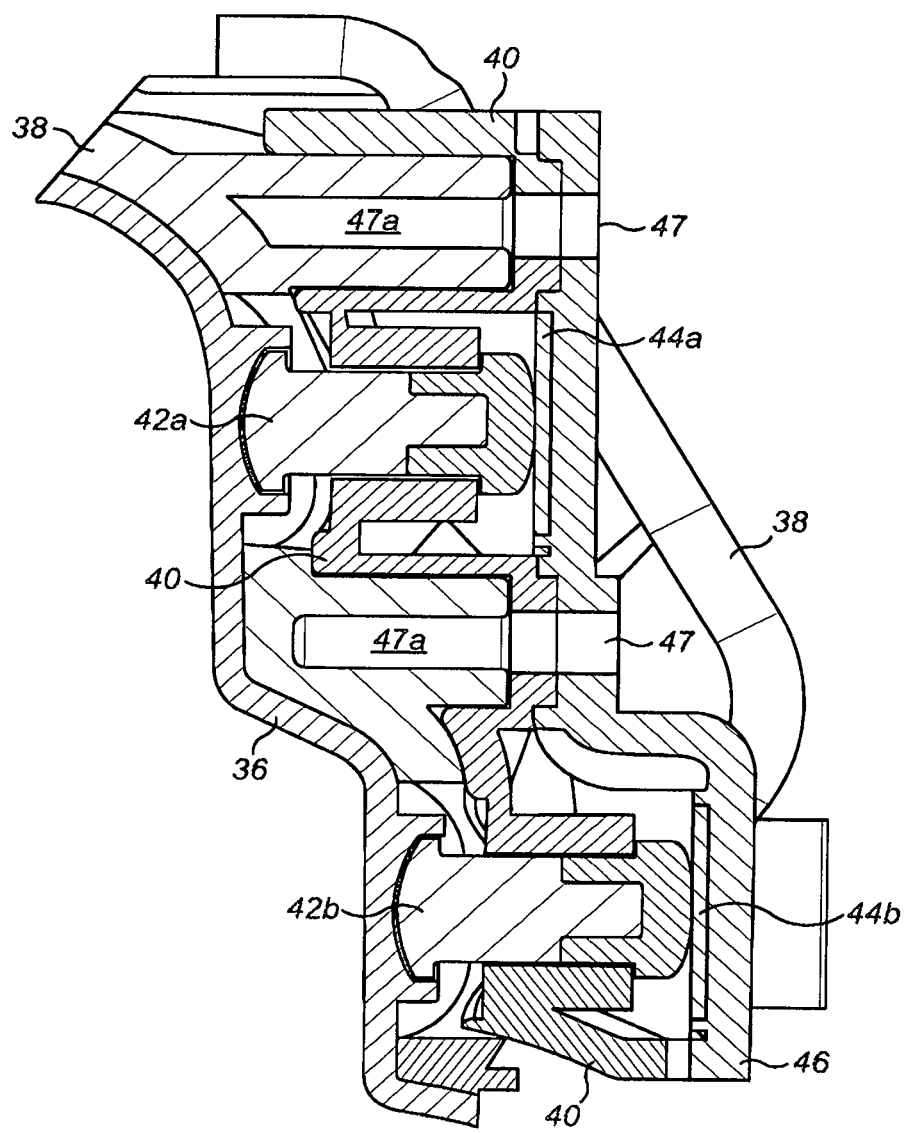
FIG. 4 is a schematic cross-sectional side view of the trigger assembly.

In more detail, the sensors 44a and 44b are pressure sensitive composite material sensors, which have a resistance that lowers when pressure is exerted on them by a user, the function of which will be described below. The sensors 44a and 44b are secured to the backing plate 46 as shown in FIG. 4. The sensors 44a and 44b are mounted so that there is, optionally, a small gap between the sensors 44a and 44b and the, optionally flexible, plungers 42a and 42b. As mentioned above, the plunger housing 40 holds the plungers 42a and 42b in position with the plungers 42a and 42b extending through openings 43a and 43b in the housing 40.

The carrier 38 is made of a rigid plastics material and side edges 39 thereof engage with the backing plate 46 as shown in FIG. 4 in order to hold the sensors 44a and 44b and the plungers 42a and 42b in position, as well as providing some physical protection to these parts.

The rubber, or plastics material, overmould 36 is located over a front face 41 of the carrier 38 to provide a water resistant and/or fluid/oil resistant front surface presented to a user.

The carrier 38 also incorporates openings 45a and 45b to allow pressure from a user's fingers to actuate the plungers 42a and 42b.

As can be seen in FIG. 4, the rear face of the overmould 36 contacts the plungers 42a and 42b to provide a direct physical contact between the overmould 36, plungers 42a and 42b the sensors 44a, 44b.

The plungers 42a, 42b are mounted so that there is a gap, as mentioned above, between an end of the plungers 42a, 42b and the sensors 44a and 44b when the plungers 42a and 42b are not depressed by means of a user pressing the overmould 36. However, the gap is optional. The plungers 42a and 42b are mounted so that when a user exerts pressure on the overmould 36 the plungers 42a and 42b move into contact with the sensors 44a and 44b to exert pressure thereon dependent on the pressure exerted by the user. When a user removes pressure from the overmould 36 the flexible plungers 42a,42b revert to their original position with a gap between the plungers 42a and 42b and the sensors 44a and 44b. The inherent flexible mechanical properties of both the overmould 36 and the plungers 42a, 44b ensure that the plungers 42a, 42b return to the starting position out of contact with the sensors 44a, 44b. Optionally, this return feature could also be achieved with a mechanical spring, however, the overmould 36 and flexible plungers 42a, 42b do create a more tactile feedback loop for a user, allowing for improved speed control through the application of pressure to the sensors 44a, 44b.

Pressure sensitive composite material sensors are a known type of sensor for providing a variable resistance relating to an amount of pressure exerted on the sensor. For example, a sensor made of prickly carbon composite material is used as a pressure sensor. In one example a composite of a metal and an insulating binder is used. Without pressure, the conductive elements of the prickly carbon or metal are too far apart to conduct electricity; whereas when pressure is applied, they move closer and electrons can pass through the insulator. The sensor may use quantum tunneling to achieve the effect mentioned above.

In this implementation the circuit in which the sensors 44a and 44b are incorporated is effectively open circuit when there is no pressure on the sensors 44a and 44b. When there is pressure on these sensors 44a and 44b then the resistance of the sensors lowers and provides a non-linear relationship of force applied against resistance.

The power tool operates in the following manner. When the tool is in a zero power state (i.e. switched off) the user must press both the forward pad 20 and the reverse pad 18 to wake the power tool 10 and enable operation. In practice, it is only necessary to press the reverse direction trigger 18 to power the circuitry of the drill, but both the reverse pad 18 and the forward pad 20 need to be depressed to activate movement of the power tool motor. The benefit of this feature is that it is useful in the case of an unintended triggering of the pads 18 or 20, for example when the power tool 10 is a box or in a user's holster.

Once both the forward and reverse pads 18/20 are pressed, the user can operate the drill by pressing either the forward pad 20 or the reverse pad 18 as is desired.

After a period of inactivity, the drill will switch off and the wake up procedure mentioned above will need to be followed again.

When active, the power to the motor or the speed of the drill is controlled by control circuitry to be proportional to the force applied to either of the trigger pads 18 or 20. If the pad 18/20 is released quickly, then the motor is decelerated and active braking is implemented via an H-bridge motor control circuit. An H-bridge circuit enables a voltage to be applied across the motor in either direction.

Figure 5B:
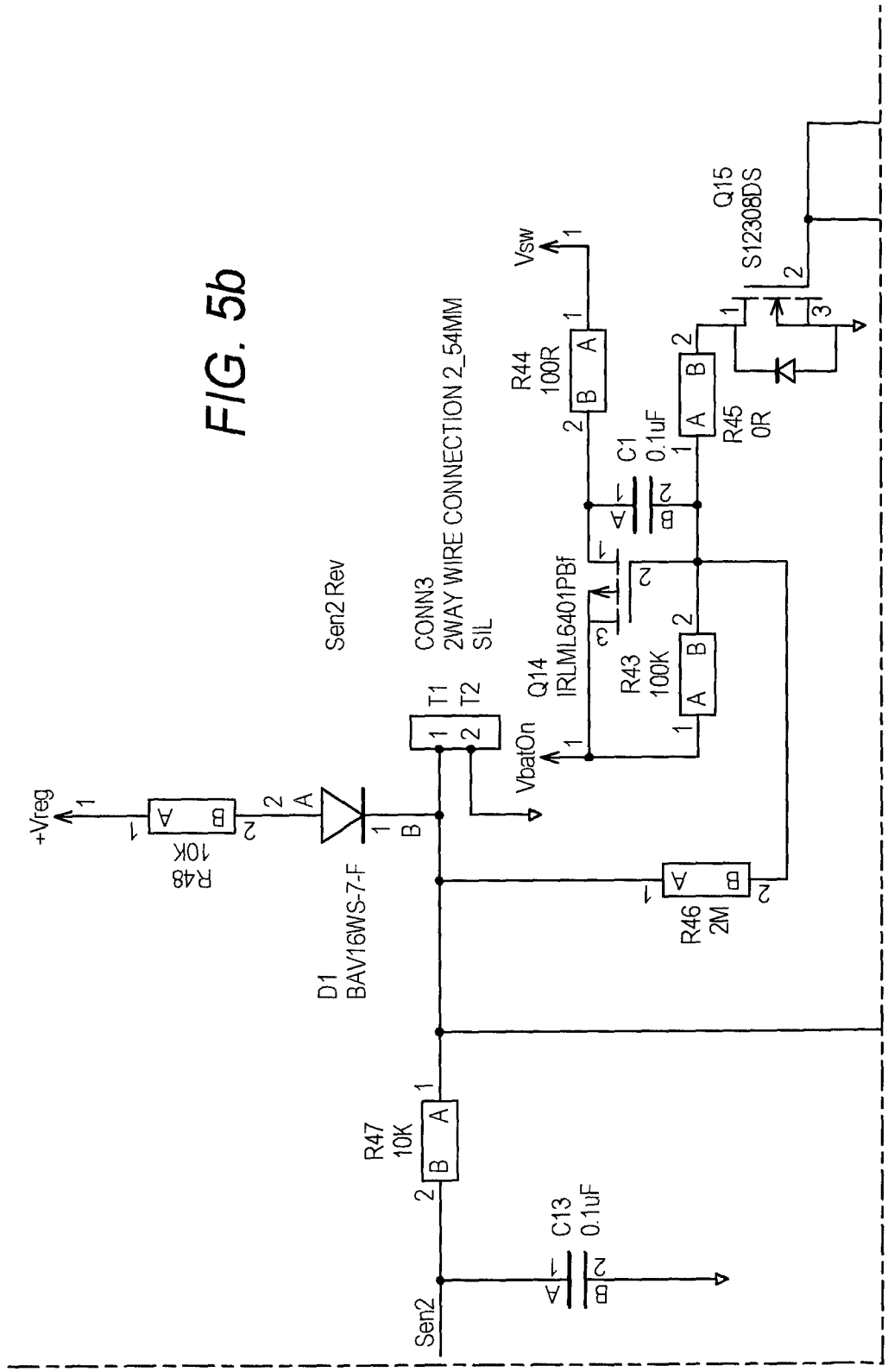
FIG. 5 is a schematic circuit diagram of a control circuit of the power tool.
Figure 5C:
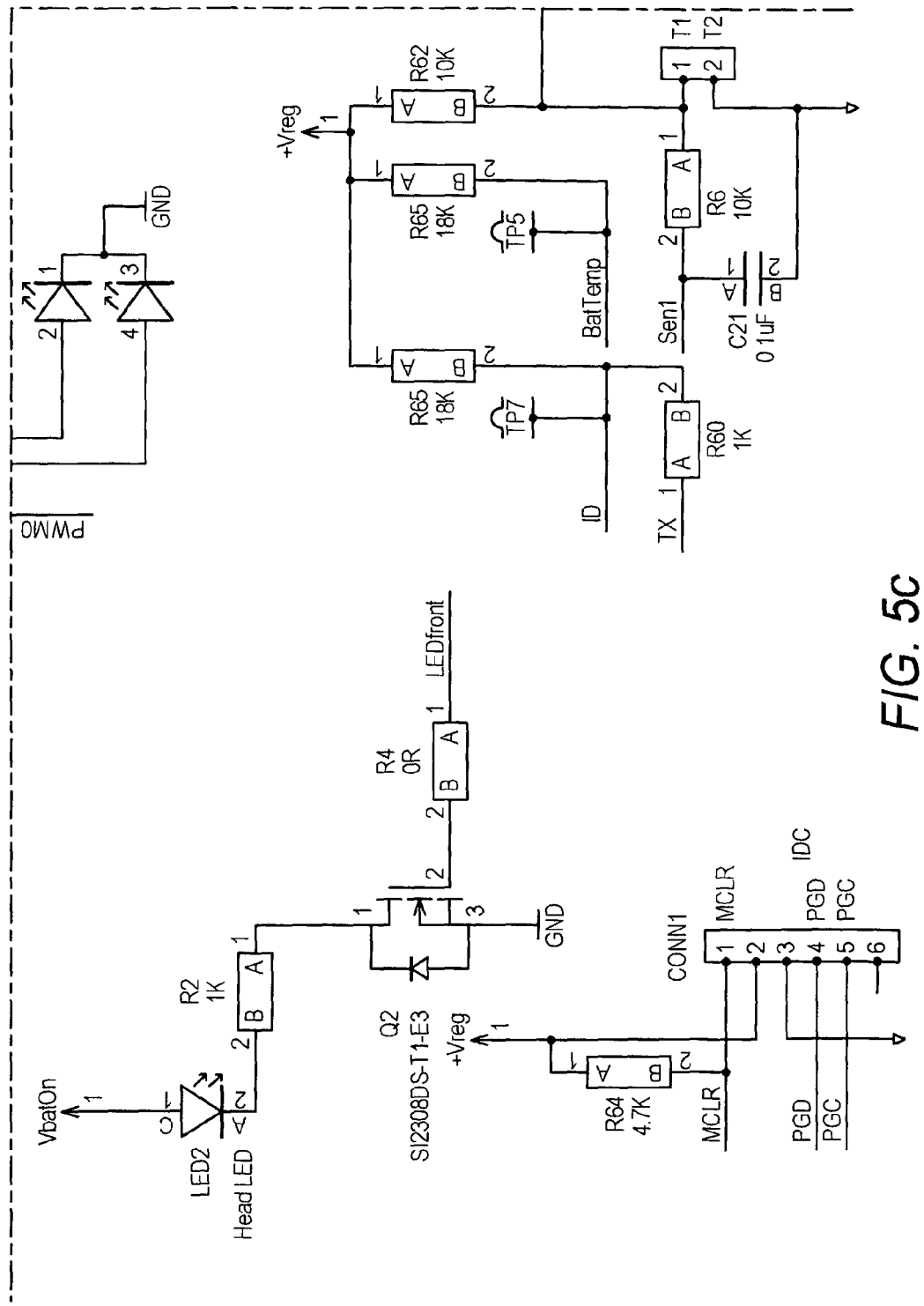
Figure 5D:
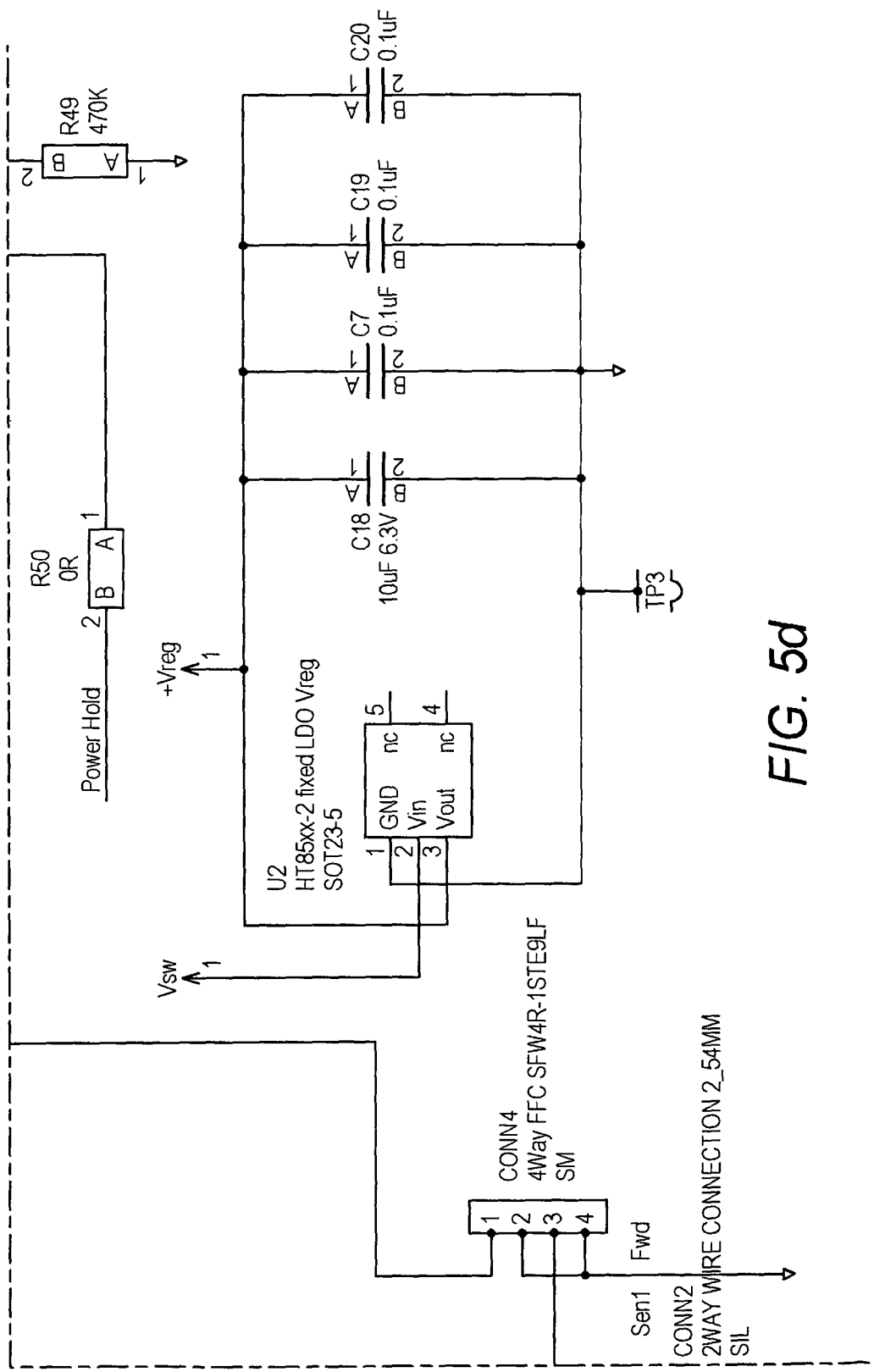

FIG. 5 shows an exploded electrical circuit by which the sensors 44a and 44b are connected to the power supply. In FIG. 5 the sensors 44a, 44b are referred to Sen1 and Sen2. CONN3 is one of the sensor connections. VbatOn is the supply from the battery pack 14. Q14 and Q15 are MOSFETs. Vsw is an unregulated supply to peripherals to control an H-bridge circuit and current sensing circuits.

U2 is a voltage regulator, which may be implemented as a microprocessor. U£ is also a microprocessor and is used to run the firmware for the circuitry of the power tool.

The remainder of the elements in the circuit are resistors R, capacitors C and diodes D. GND shows a connection to ground.

The circuit shown in FIG. 5 functions as follows. When neither of the sensors 44a, 44b is triggered, the voltage on the regulator U2 is switched off and the regulator voltage Vreg is also off. Also, the MOSFET Q15 is off, which in turn switches the MOSFET Q14 off, so Vsw is 0 volts.

When either of the sensors 44a, 44b is activated then both U2 and Q15 are turned on, once the power supply unit has stabilised and the microprocessor U2 has booted up, testing the integrity and voltage level. Then, an output called "power hold" shown in FIG. 5 is set to high, which in conjunction with Q15 passes the voltage as a forward bias for the depressed sensor 44a/44b and the "power hold" function is engaged. The power hold function maintains the possibility of powering the motor to therefore allow instant operation of the power tool motor without having to go through the pressing of both pads 18/20 and the wake up feature mentioned above. When the power hold signal is low, the supply of power to the motor will be prevented if both of the sensors 44a, 44b are not triggered.

These features have the benefit of saving battery power in a zero power state. Also no hardware on the switches or contactors will be required, which will reduce cost.

Another feature of the power tool 10 is that the sensors 44a, 44b are used to control direction, speed and braking of the power tool. The two sensor operation allows true proportional speed control on braking, based on the sensor pressed first. If the forward sensor 30 is pressed first, then pressing the reverse sensor 18 will have no effect, until both sensors 18 and 20 are released and then again the forward or reverse sensor 18/20 is pressed. As mentioned above H-bridge control of the drill motor allows rotation in either direction.

The benefits of the arrangement described above are that an analogue response to the pressure applied by a user to either of the forward or reverse pads 18/20 is achieved. The use of active braking will also save cost in gear box complexity for the power tool motor.

Advantages that arise from the above described device include an improved grip for a user, because the limited travel of the pad 18/20 means that a user does not have to change his grip when changing a speed of the motor, which was required in the longer travelling slide-type resistor. Given the overmould section 36 the user cannot trap his finger between the trigger and housing as was the case previously. The limited travel of new 'touch' trigger keeps the grip size approximately the same size during operation.

Sensitivity and control of the power tool is enhanced with the sensors 44a,b. The user commands infinite control of the speed range, unlike incremental jumps in speed on a traditional trigger mechanism.

The automatic lock out and safety feature is an element of the electronics control system. It de-activates the system if left un-used for a pre-set period. This feature also acts as a wake up function. Both forward and reverse pads 18/20 are depressed in unison to activate the electronics. The system stays in a zero power state (no current draw, no significant battery drain) until woken up.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A power tool comprising:
a motor for driving a driven element of the power tool;
a handle section; and
first and second pressure sensitive switches operable to control operation of the motor, the first and second pressure sensitive switches being housed in a switch assembly, wherein the switch assembly incorporates a sensor element and a contact element for each of the first and second pressure sensitive switches, and the switch assembly includes a flexible unitary cover element for both the first and second pressure sensitive switches.

2. The power tool as claimed in claim 1 which is a portable power tool.

3. The power tool as claimed in claim 1, in which the pressure sensitive switches include at least one variable resistance switch.

4. The power tool as claimed in claim 1, in which the pressure sensitive switches include at least one switch having a resistance that varies according to an amount of pressure applied to the switch.

5. The power tool as claimed in claim 1, in which the pressure sensitive switches include at least one switch comprising a pressure sensitive composite material.

6. The power tool as claimed in claim 1, in which one of the switches is adapted to cause the motor to drive in a forward direction and one of the switches is adapted to cause the motor to drive a reverse direction.

7. The power tool as claimed in claim 1, which is adapted to enable power to be provided to the motor only after both of the first and second pressure sensitive switches have been activated.

8. The power tool as claimed in claim 1, in which one of the switches is operable to power-up a control circuit of the power tool when depressed.

9. The power tool as claimed in claim 1, in which at least one of the switches comprises a sensor element, which incorporates a pressure sensing material.

10. The power tool as claimed in claim 1, in which the at least one switch includes a resilient contact element adapted to contact the sensor element in response to pressure exerted by a user.

11. The power tool as claimed in claim 10, in which the contact element is biased to leave a space between it and the sensor element in the absence of pressure from a user exerted thereon.

12. The power tool as claimed in claim 1, in which the switch assembly includes a guide element to guide movement of the contact elements.

13. The power tool as claimed in claim 1, in which the one of the first and second pressure sensitive switches is operable to power-up a control circuit of the power tool when depressed and the other switch is operable to cause a variable power to be supplied to the motor, wherein the power is varied dependent on an amount of pressure applied to said other switch.

14. The power tool as claimed in claim 13, in which said other switch is operable to cause braking of the motor when a pressure applied to said other switch is reduced.

15. The power tool as claimed in claim 1, in which the power tool is any one of power drill, an impact driver, a rotary tool, an oscillating-head tool or a torch.

16. A switch assembly for a power tool having first and second pressure sensitive switches operable to control operation of a motor of the power tool, the first and second pressure sensitive switches being housed in the switch assembly, the switch assembly comprising:
   a sensor element and a contact element for each of the first and second pressure sensitive switches; and
   a flexible unitary cover element for both the first and second pressure sensitive switches.

17. A hand operated electrical device comprising:
   a head section that incorporates illumination means;
   a handle section; and
   first and second pressure sensitive switches operable to control operation of the head section, the first and second pressure sensitive switches being housed in a switch assembly, wherein the switch assembly incorporates a sensor element and a contact element for each of the first and second pressure sensitive switches, and the switch assembly includes a flexible unitary cover element for both the first and second pressure sensitive switches.

18. A hand operated electrical device comprising:
   a head section that incorporates a motor;
   a handle section; and
   first and second pressure sensitive switches operable to control operation of the head section, the first and second pressure sensitive switches being housed in a switch assembly, wherein the switch assembly incorporates a sensor element and a contact element for each of the first and second pressure sensitive switches, and the switch assembly includes a flexible unitary cover element for both the first and second pressure sensitive switches.

* * * * *